May 20, 1958     R. A. WALLACE     2,835,309

EXPANDERS FOR JOINING TUBULAR MEMBERS

Original Filed June 28, 1949     4 Sheets-Sheet 1

INVENTOR.
Robert A. Wallace
BY Green, McCallister + Miller
HIS ATTORNEYS

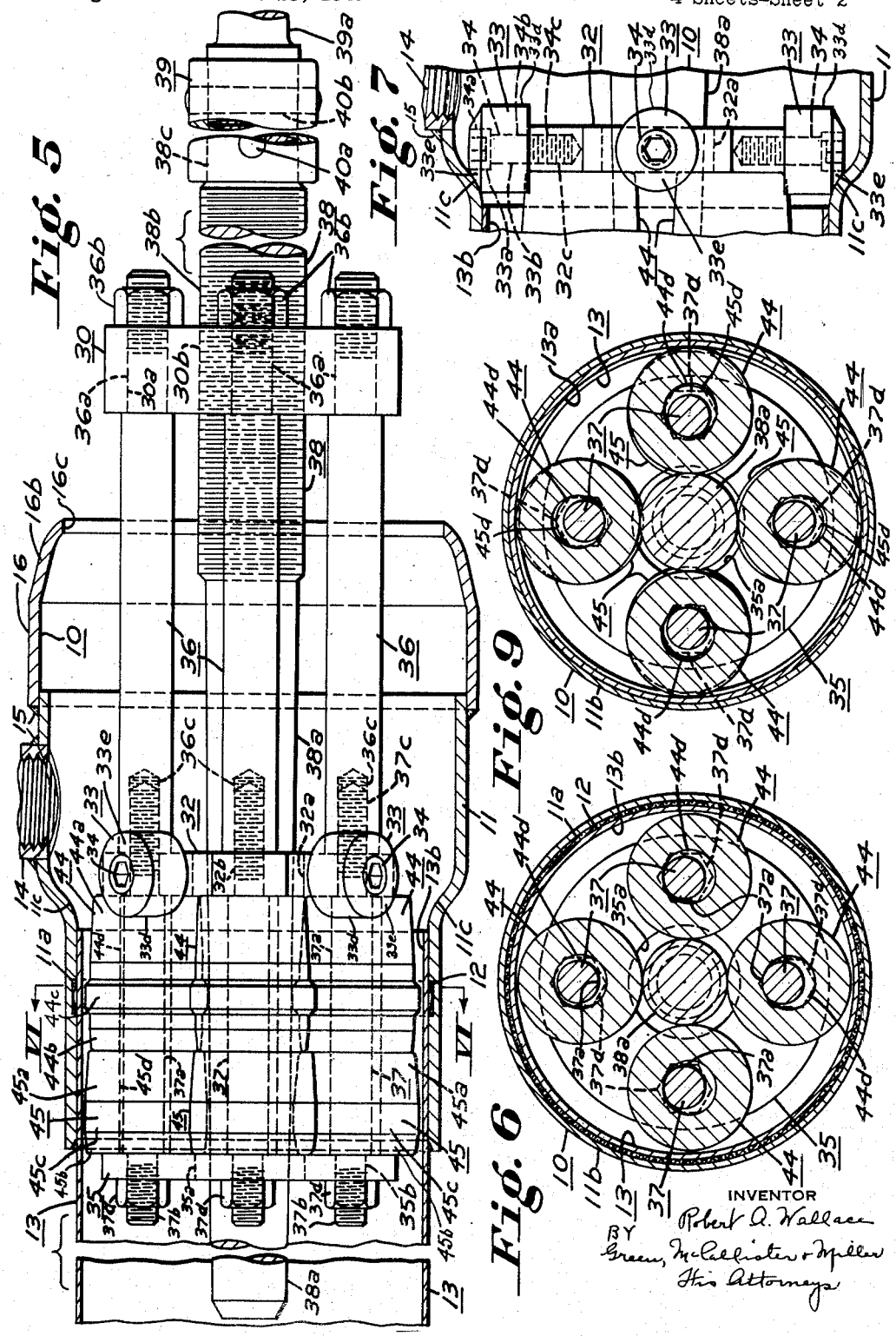

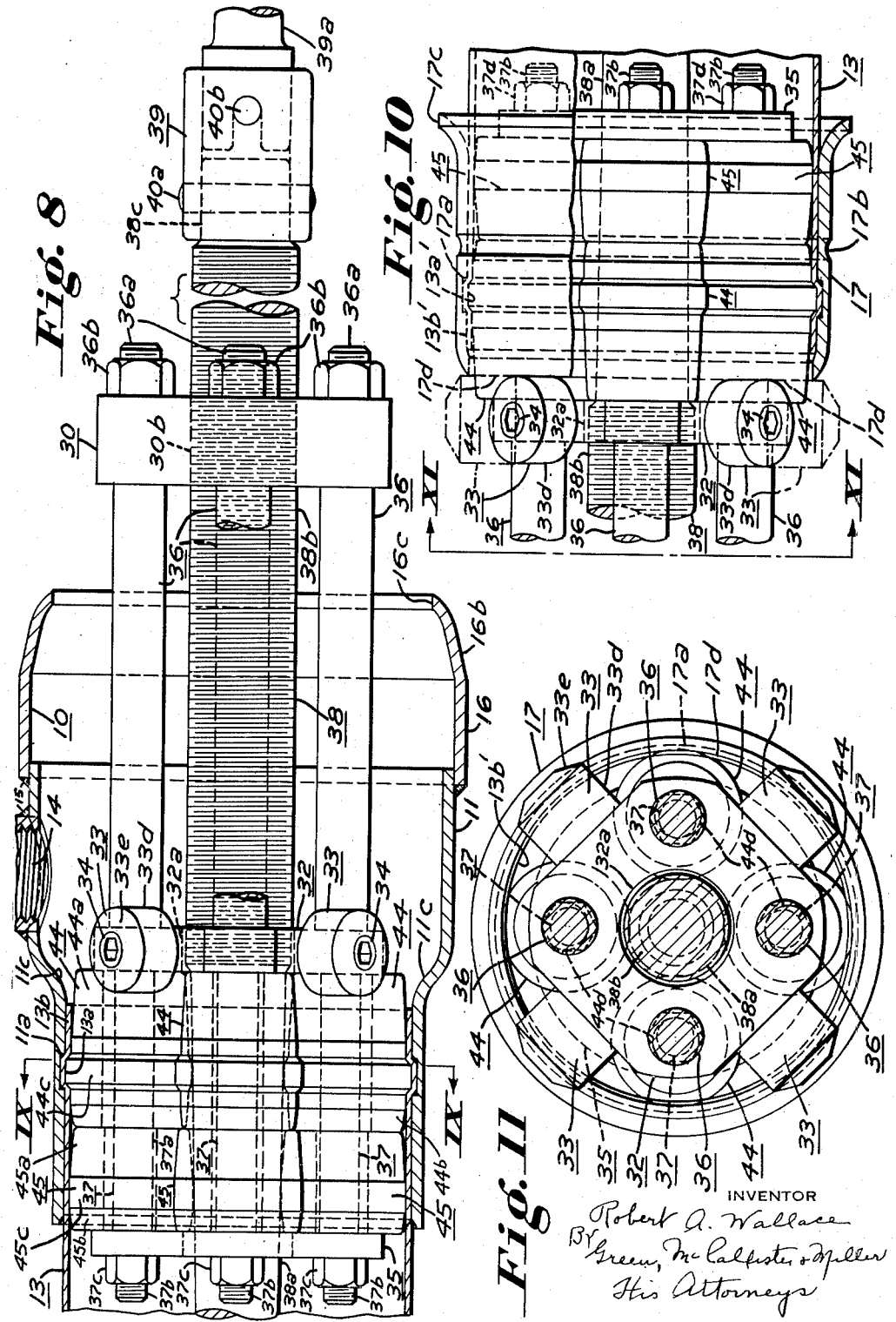

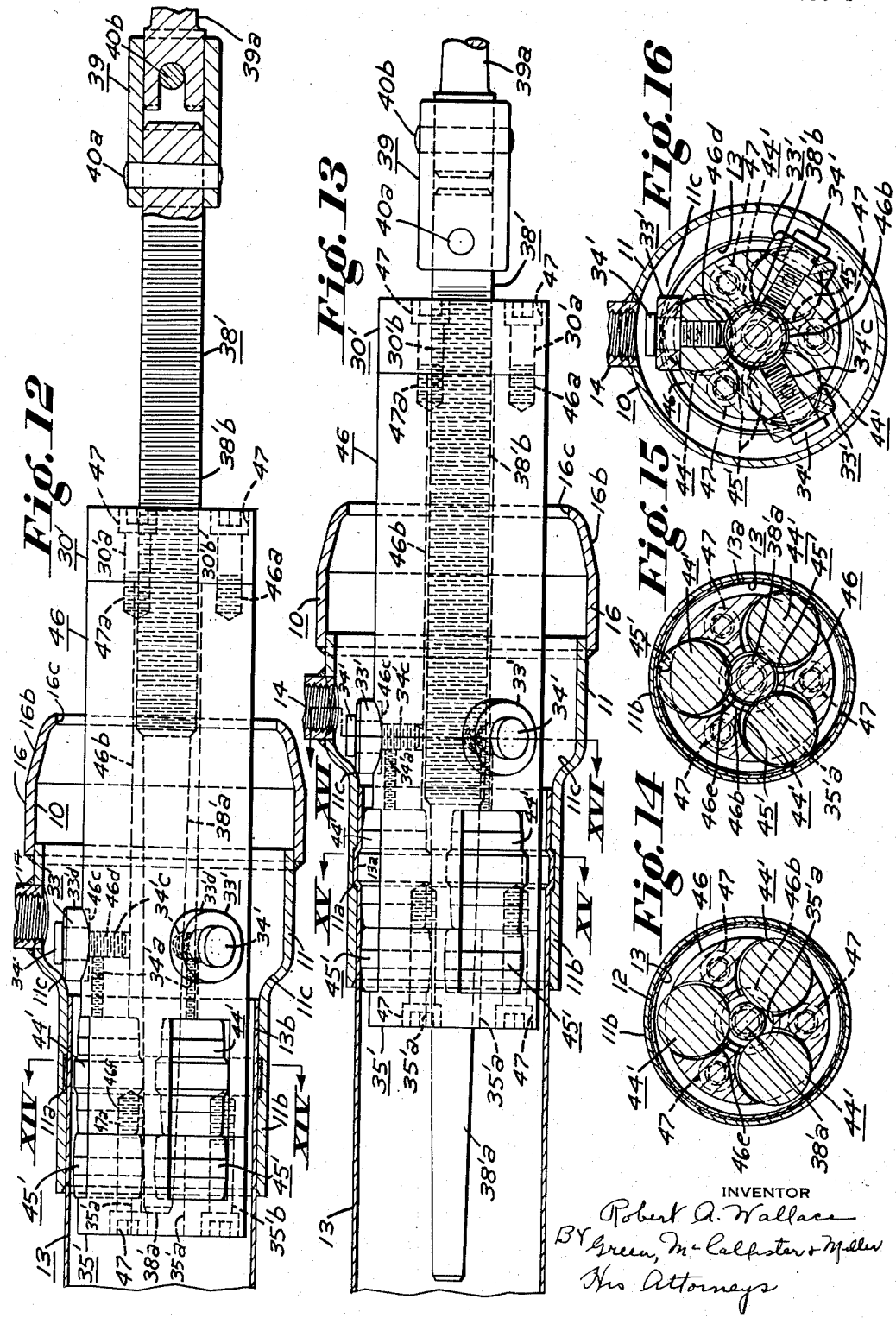

United States Patent Office 2,835,309
Patented May 20, 1958

2,835,309

EXPANDERS FOR JOINING TUBULAR MEMBERS

Robert A. Wallace, Venetia, Pa., assignor to Walter O. Beyer

Original application June 28, 1949, Serial No. 101,771, now Patent No. 2,709,092, dated May 24, 1955. Divided and this application October 11, 1954, Serial No. 465,334

2 Claims. (Cl. 153—82)

This invention relates to the fabrication of coupling bodies and tube end sections for fluid couplings and to expander apparatus or tools for securing a coupling body or a tube end section to a pipe, conduit, or tube member. This application is a divisional application of Serial No. 101,771, filed June 28, 1949, now U. S. Patent No. 2,709,092, issued May 24, 1955.

For purposes of illustration, my invention is shown as applied to the making of a general type of fluid coupling such as disclosed by Beyer and Tarn in their U. S. Patent No. 2,259,453. This coupling consists of three essential parts, namely, a coupling body having a tapered or cone-shaped operating surface, a flexible grip annulus or element which is adapted to move along the tapered surface of the coupling body and to engage the outer circumference of a pipe member to be held, and a resilient gasket having a pressure heel that is, under an application of fluid pressure, adapted to force the grip element towards a converging end of the sloped surface of the coupling body and into locking engagement between the coupling body and the pipe member with a force that is proportional to the fluid pressure. The grip element has an inherent flexibility and a tendency to move backwardly along the tapered surface of the coupling body when fluid pressure is released.

Although my invention is not limited to the making of such a type of coupling, it has particular importance as applied to a coupling whose operating-surface-carrying parts should have a stronger or more wear-resistant construction than the pipe members to be connected. I have been able to devise a relatively inexpensive, practical type of coupling provided with a pair of operating-surface-carrying parts that may be of any suitable strength characteristics, independently of the strength characteristics required for the pipe, tubing, or conduit members. In accordance with my construction, only immediately coupled or operating surface portions need to be strengthened or reinforced. This results in a great saving of material and weight and as a whole, facilitates assembly and disassembly of a quickly demountable or portable pipe line system. My invention also provides simple and effective procedure for making connections with pipe members, and if desired, for mounting a coupling tube end or a coupling body on pipe members in the field. The latter feature makes possible the utilization of more locally available pipe and at a considerable saving in transportation costs.

Where thin wall tubing is to be used, and its use is highly desirable from the original cost standpoint of a system, as well as from the standpoint of weight considerations, labor and equipment required in handling the system, an important problem is encountered in obtaining a suitable type of joint or connection between the coupling body and the pipe member upon which the coupling body is to be mounted. The same problem arises in providing a joint or connection between the other end of the pipe member and a tube end part that is to provide the other operating surface for the coupling. In an ordinary utilization of my invention, a female coupling body will be attached to one end of a pipe member and a reinforcing tube end part will be attached to the other end of the pipe member. In this way, a large number of suitable length pipe members may be demountably assembled in the field for irrigation purposes, for example, and after use, may then be disassembled, moved to another location, and quickly reassembled and used.

It has thus been an object of my invention to meet the problem presented in providing a coupling construction having relatively inexpensive and effective interfitting operating-surface-carrying parts that will have the necessary strength characteristics to withstand mistreatment, as well as maximum fluid pressures and mechanical stresses and strains to be encountered in a field utilization;

Another object has been to devise interfitting coupling parts that may be readily connected in a permanent manner to pipe members of an entirely different material, as well as of entirely different strength, surface characteristics and/or wall thicknesses;

A further object has been to provide an improved expander or tool construction for joining coupling connections to pipe members;

A still further object has been to devise apparatus or tools for making a highly effective, inexpensive, and simplified form of connection between hollow members, and particularly, between hollow members of different characteristics or of different wall thicknesses.

These and many other objects of my invention will appear to those skilled in the art from the illustrated embodiments thereof hereinafter set forth and explained.

In a sense, my present invention is based upon the determination that relatively thin wall pipe or tubular members could be employed in a flexibly coupled system for carrying a given maximum fluid pressure in which the pressure varies between zero and a maximum and may surge during the utilization of the pipe members. To carry out this determination, I have devised separate coupling operating-surface parts that are constructed to withstand the greater forces to which they are subjected and in such a manner that they can readily and suitably be connected to the pipe members. As distinguished from the coupling housing body part or portion, the strength characteristics of the pipe members may be selected on the basis of the pressure of the fluid to be carried. As an example, thin wall aluminum alloy tubing or pipe will be sufficient for carrying fluids under moderately high pressure conditions, but the aluminum alloy would not have the necessary physical characteristics for use in making the immediately coupled, or operating parts or portions of the coupling. It is desirable to construct the coupling housing connections or operating surface portions of ferrous metal and to provide them with a greater wall thickness than that of the pipe members. My invention eliminates the difficulties encountered in attempting to secure or weld unlike metals and materials, and the joining operation may be effected either in the manufacturing plant or in the field, as desired. That is, the operating portions of the coupling unit, that is, the coupling body, the tube end, and the coupling elements (gasket and coil), can be shipped to the distributor or ultimate user in the field, pipe or tubular members may be separately shipped from an entirely different source, and the body and tube end parts may be quickly and effectively mounted on end portions of the pipe members in a very simple manner in the field. This permits the user to select his own pipe and to obtain it from local sources. The joint produced in this manner is highly effective; no failures have been encountered in its utilization.

To more specifically designate the two operating-surface-carrying parts of the coupling unit which are of reinforced or strengthened construction, they have been termed the coupling, consisting of a coupling body and nose and a tube end which is the male end reinforcing section. The coupling body and nose constitute the female housing or shell part which is provided with the tapered operating surface or nose, while the tube end is the male shell portion which fits within the coupling body and is adapted to be secured over an end of the pipe member or tubing which is being coupled. The housing, on the other hand, may be adapted to be closed off for a dead end cap connection as a "coupling cap," or may be so constructed as to be secured to a pipe member or threaded pipe nipple.

In the drawings, Figure 1 is a longitudinal vertical sectional elevation through a coupling unit constructed in accordance with my invention and illustrating a suitable relative position of the working parts thereof before fluid pressure has been applied;

Figure 1:
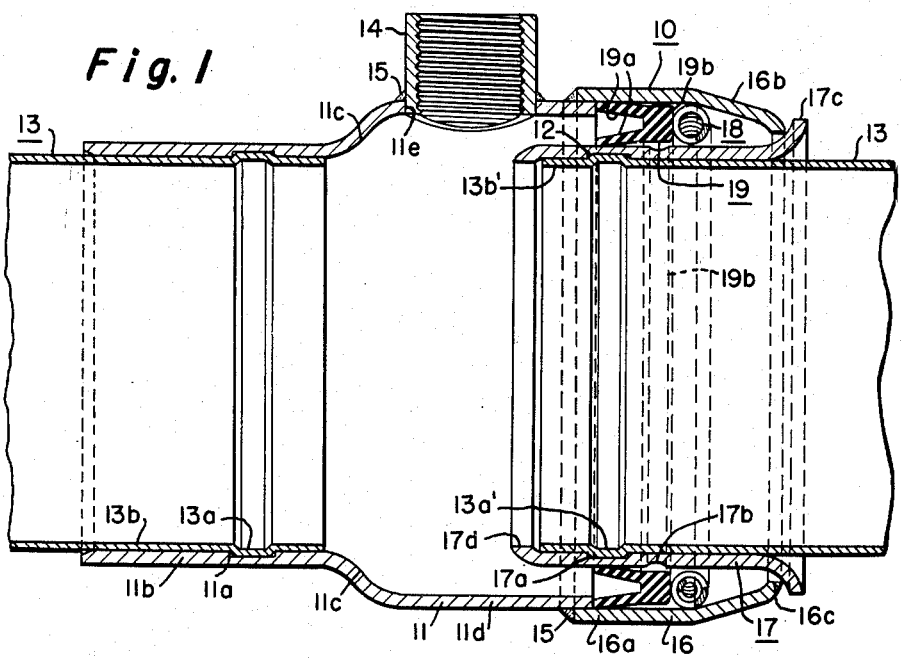

Figure 5 is a longitudinal sectional view as taken through a coupling housing constructed in accordance with my invention and showing a roller-expander device or a tool for securing an end of a pipe or conduit member to the coupling body, the device which is constructed in accordance with my invention, is adapted to roll-in a groove, or if desired, spaced grooves about an end portion of the pipe member to be connected to the coupling body; this figure shows the tool or device in a preliminary or starting position;

Figure 6 is a transverse sectional view in elevation taken along the line VI—VI of Figure 5;

Figure 7 is a fragmental sectional detail view partially in elevation showing a guide means which is associated with the tool and is taken after the tool has been turned 45° with respect to its position in Figure 5;

Figure 8 is a view somewhat similar to Figure 5, but illustrating the relative position of the parts of the tool or device after a rolling-in operation has been effected thereby;

Figure 9 is a transverse sectional view taken along the line IX—IX of Figure 8;

Figure 10 is an elevational view partially in section showing the tool of Figures 5 and 8 as employed in rolling-in a connection groove or offset in a tube end part that may be secured on an opposite end of the same pipe member; this figure shows the tool in its final position after the completion of the rolling-in operation;

Figure 11 is a vertical sectional view taken along the line XI—XI of Figure 10;

Figure 12 is a view similar to Figure 5 illustrating a modified form of rolling-in device or tool which may be employed for a smaller size coupling where space limitations are critical; in this figure the tool is in its preliminary or starting position;

Figure 13 is a view similar to Figure 12, but showing the rolling-in device or tool in its final operative position after the completion of a rolling-in operation;

Figure 14 is a vertical sectional view taken along the line XIV—XIV of Figure 12;

Figure 15 is a vertical sectional view taken along the line XV—XV of Figure 13; and Figure 16 is a vertical sectional view taken along the line XVI—XVI of Figure 13.

In accordance with a preferred procedure, I fabricate the coupling body 11 by first providing a suitable blank of the proper diameter and wall thickness. The blank may be cold drawn to shape it into a suitable size of cup. The bottom of the cup is then pierced, preferably in a spaced relation to the cylindrical portion of the cup to provide an inner flange, and the bottom of the cylinder thus produced is redrawn and the inner flange is forced out to form a continuation of the cylindrical end thereof. If a connecting member is to be mounted on the coupling body, I then pierce a side hole in the shaped body and weld one half of a standard pipe coupling 14. The body 11 is finished by trimming the edge of its larger diameter 11d and then machining-in an annular joint, offset, connection, or fastening groove 11a of band-like, widened or substantially rectangular section in the inner periphery of its sleeve 11b. The tube end 17 may be also made from a suitable size blank which is draw-formed, pierced and also provided with a band-like connection groove 17a of substantially rectangular section within its inner periphery. The nose 16 that carries the tapered working surface portion 16b and the body 11 of the coupling housing are separately draw-formed from separate blanks and welded together at 15, see Figure 1. The coupling housing or housing body, as a whole, as well as the tube end may be then secured upon an end of a pipe or tubular member 13 by first placing a suitable mastic filler 12 in the connection groove, inserting an end of the pipe within the sleeve 11b of the coupling body or in the tube end 17, as the case may be, and then rolling a groove or offset wall portion or peripheral band 13a into the pipe end in exact alignment with the connection groove in the sleeve of the coupling body or the tube end, to bend out or force an annular or circular wall portion of the pipe end into the connection groove, and to provide a tightly-locked joint therebetween. This operation is accomplished in such a manner as to squeeze out some of the mastic from the connection groove, leaving mastic in the spacing between the corners of the connection groove and the rolled-in groove of curved section, and to provide an axially-spaced, double-line contact of the rolled-in groove with respect to the connection groove. The connection joint construction is such that any separating forces are resisted by the edges of contact and such that the rolled-in groove has a pair of opposite edges which tightly abut adjacent shear or corner edges of the rectangular connection groove.

In Figure 1, I have shown a coupling unit 10 wherein the sleeve 11b of the housing and the tube end 17 thereof are securely connected to the ends of pipe or conduit members 13. The coupling housing part, as shown, is made up of a body portion 11 and a nose portion 16 that interfit and are secured together into a unitary housing construction by arc-weld metal 15. The body portion 11 has an enlarged, cylindrical front end 11d whose outer diameter substantially corresponds to the inner diameter of an enlarged cylindrical back end 16a of the nose or operating surface carrying portion 16. Thus, the end portion 16a may be frictionally slid or telescoped over the end 11d.

The cylindrical back end or sleeve 11b of the body portion 11 of the coupling housing part is of smaller diameter and is integrally connected to the enlarged front end 11d by a shoulder 11c. A continuous annular groove or offset of rectangular band-like section 11a is provided in the sleeve end 11b to receive a continuous rolled-in annular wall offset or grooved band portion 13a of curved section of an end portion 13b of the pipe member 13. Mastic material, such as a caulking or rubber-like material 12 that is now available on the market, is positioned to fill up any spaces between the grooves 11a and 13a and to seal the connection. The end portion 13b of the pipe member 13 closely telescopes or frictionally fits within the cylindrical end 11b of the connection portion 11 of the coupling and with the interfitting grooves provides an effective, simple, and efficient joint connection therewithin.

If a vent connection such as a sprinkler is desired, the enlarged cylindrical front end 11d of the coupling body portion 11 is provided with an opening 11e to which a section of threaded pipe coupling 14 may be secured by weld metal 15, as shown.

The nose portion 16 of the coupling housing part is provided with a tapered or cone-shaped front or operating-surface-carrying end 16b which terminates in an inwardly-depending or flared safety edge or flange 16c. The other end 13b' of each pipe member 13 is shown provided with an operating-surface-carrying male or tube end part 17 which is adapted to be secured thereto. That is, it has a groove 17a corresponding to the groove 11a and is adapted to receive a rolled-in groove portion 13a' of the pipe member. The connection is, of course, sealed by mastic material 12. In this way, the other end of the pipe member 13 is provided with an operating-surface-carrying tube end part which cooperates with the cone-shaped or tapered operating surface-carrying portion 16b of the nose 16 of the coupling housing.

A U-shaped gasket 19 of a resilient or rubber-like material is adapted to be positioned in the spacing between the cylindrical end 16a of the nose 16 and the tube end part 17 with its open, pressure chamber facing backwardly of the coupling and being open to the fluid carried by the coupling. As shown, it has a pair of spaced-apart feather edges 19a that define the chamber therein and are adapted to rest upon adjacent surfaces of 16a and 17. An annular-shaped, flexible locking or grip element 18 of spring-like construction made up of flexible and spaced-apart convolutions is positioned between a heel portion 19b of the gasket 19 and the tapered surface 16b of the operating surface portion 16. In Figure 1, the elements 18 and 19 are in a normal position when fluid pressure is off for permitting an axial withdrawal of the intermediate or right hand pipe member 13 and its associated tube end part 17 with respect to the housing part of the coupling.

It will be noted that a pierced edge 17d of the tube end 17 is of slightly less diameter than the inner diameter adjacent to pipe 13 to serve as a guide stop for the inner edge of the pipe 13 when it is introduced therein, before the groove rolling-in operation which will be hereafter described. The edge 17d also serves as an additional strengthening support for the connection between the tube end 17 and the end portion 13b' of the pipe member 13. The bell end 17c of the tube end part 17 is turned-out or flanged and extends slightly beyond the corresponding turned-in edge 16c of the coupling nose 16 of the housing part. Thus, the ends 16c and 17c serve as limit stop means or portions for limiting the maximum inward movement of the pipe member 13 when it is introduced into the housing body part of the coupling.

It will also be noted that the tube end part 17, in addition to having an outward projecting flared or bell-shaped end 17c, is provided with an intermediate, slightly dished-in or grooved portion 17b along the outer periphery of its cylindrical body that is continuous thereabout and serves as a safety feature in the construction. That is, although it will normally have no function, since the operating elements 18 and 19 will positively hold the tube end part 17 within the housing part, an extremely high pressure, such as a surge, may be suddenly applied in the field, in which event, the tube end part 17 may move outwardly to the right of Figure 1. The grip element 18 would then engage within the safety groove 17b to provide a mechanical interlock and positively prevent further separation. The groove is preferably of slight depth, in order that the grip element 18 may be easily released when the pipe member 13 is to be removed from the coupling and, of course, after fluid pressure is off.

In Figures 5 to 9, inclusive, I have shown how the sleeve end 11b of coupling body 11 may be secured on a pipe end 13b and in Figures 10 and 11, how the tube end 17 may, in a like manner, be secured on an opposite pipe end portion 13b'. In these figures, I have also disclosed a novel form of device for rolling a joint groove in an end of the pipe member 13 and for, at the same time, squeezing out excess mastic that may be placed in the internal groove 11a or 17a of the respective coupling sleeve and tube end components of the coupling unit. These figures show a device that may be used for larger size couplings and pipe members, for example, for pipe members of a size of about three to six inches in diameter and larger.

In Figures 12 to 16, inclusive, I have shown a modified form of device suitable for smaller sizes of pipe and coupling members, for example, for pipe members of a size of about two inches plus or less. This form has been provided because of space limitations involved in joining a smaller size of pipe member.

Referring again to Figures 5 to 11, inclusive, my rolling-in or joint expanding device is shown provided with three spaced-apart plate, cross support portions or circular disc-like members 30, 32 and 35. These members are held in a spaced-apart, mounted relationship with respect to each other by spacer rods, studs, or bolts 36 and 37 that are preferably four in number and are spaced equi-distantly about the spacer plate members 30, 32 and 35, respectively. The back plate member 30 has a series of holes 30a for receiving reduced end portions 36a of the studs 36 that extend therethrough; these studs are secured thereon by nuts 36b mounted on their threaded ends. When each nut 36b is tightened down, it holds the plate member 30 against a shoulder formed by the reduced front end portion 36a of each rod 36 and the main body portion thereof. The plate 30 is also provided with a central threaded bore 30b through which a wedge shaft or screw-down 38 extends.

It will be noted that an intermediate portion 38b of the wedge shaft is provided with screw threads which engage the threaded bore 30b of the front plate or spacer member 30 to thus guide and control rotative movement and advancement of the wedge shaft 38.

The intermediate spacer or plate member 32 is held in a mounted relationship with respect to the back plate member 30 and the front plate member 35 by studs, rods, or bolts 37 which at one end have threaded male portions 37c of reduced diameter that are adapted to extend through holes 32b in the plate member 32 and to securely engage threaded end bores 36c in the back ends of the spacer studs 36. The opposite ends 37b of the spacer and bearing studs 37 are of reduced diameter and are adapted to extend through holes 35b in the front plate member 35 to receive nuts 37d thereon. It will be noted that when the back, threaded ends 37c of the studs 37 are screwed down into the threaded bore portions 36c of the studs 36 and the nuts 37d are tightened down, that the intermediate spacer plate member 32 is securely mounted in a spaced-apart relationship with respect to the back plate member 30 and with respect to the front plate member 35.

The intermediate plate member 32 has an enlarged central bore 32a therethrough and the front plate member has a corresponding bore 35a to bypass a tapered, integral wedge portion 38a of the wedge shaft 38.

As shown particularly in Figures 5, 6, and 9, a pair of rollers 44 and 45 are mounted on each stud member 37. The back, flange or tongue banding or grooving roller 44 has an internal, concentric, enlarged bearing bore portion 44d that permits it to move radially with respect to bearing surface portions 37a of the respective stud shaft or member 37 upon which it is rotatably positioned. In a like manner, the banding-expander, front guide roll 45 has a concentric bearing surface bore portion 45d of enlarged diameter which permits it to be loosely positioned and to move radially on the bearing surface portion 37a of the same stud shaft or member 37. That is, a pair of rollers 44 and 45 are rotatably mounted on each of the stud members 37 and between the plate members 32 and 35. It will be noted that four pairs of rollers are provided, one pair for each stud member 37.

As shown particularly in Figures 8, 10, and 11, as the threaded portion 38b of the wedge shaft 38 advances and carries the wedge-shaped or very gradually tapered portion 38a forwardly, the latter portion makes what may be termed a frictional line engagement or contact with each roller of each pair of rollers 44 and 45. As a result, the rollers 44 and 45 are slowly moved radially-outwardly into frictional engagement with the inner circumference of the end portion 13b or 13b' of the pipe member 13 to effect the forming of a rolled-in groove 13a or 13a'. A cylindrical or annular band portion 45c of each front roller 45 engages the inner wall of the pipe member 13 and expands the pipe member adjacent the sleeve end of the coupling or the tube end to take up any possible looseness between the two surfaces. An outwardly-projecting intermediate rim portion 44c of each back roller 44 engages the pipe member to bend or force a band thereof into the groove 11a of the sleeve end 11b of the coupling body 11 or into the groove 17a of the tube end 17. As shown, the centering rim portion 45c of each front expander roller 45 has a cylindrical face that lies between tapered faces 45a and 45b. In a like manner, the rolling-in rim face 44c of each back expander roller 44 lies between tapered faces 44a and 44b. As shown in Figure 5, the faces 44a and 44b have end face portions that taper at their inner areas into inner annular band portions immediately adjacent to, along opposite sides of, and bounding the intermediate face or annular rim portion 44c. That is, the portions 44a and 44b rise from opposite ends of the roller 44 and the portions 45a and 45b rise from opposite ends of the roller 45.

As shown particularly in Figures 5, 7, 10, and 11, the intermediate plate member 32 carries a series of radially-projecting guide rollers 33, for example four, that are spaced alternately between the roller pairs 44 and 45 and are rotatably mounted back of the rollers 44 and 45 and on the intermediate plate member. Each of the guide rollers 33 has a cylindrical portion 33d and a tapered or cone-shaped end 33e. When the device is used to secure a pipe end portion 13b to a coupling housing, the tapered end 33e is adapted to engage the shoulder 11c, see Figure 7, at the correct position to limit the maximum introduction of the device into the sleeve 11b to guide the device during its initial rolling operation. When a tube end 17 is to be secured to a pipe end portion 13b', see Figures 10 and 11, the cylindrical portion 33d abuts the edge 17d of the tube end for the same purpose. As shown particularly in Figure 7, a cap screw or pin 34 having a head portion 34a is adapted to be positioned within or to be inset within an enlarged bore portion 33a of each roller 33 and has a shank 34b that extends through a smaller bore portion 33b and terminates in a threaded end portion 34c; the latter is secured within a threaded hole portion 32c of the plate member 32. The unthreaded shank portion 34b serves as a bearing surface to rotatably mount the roller 33.

Figure 2:
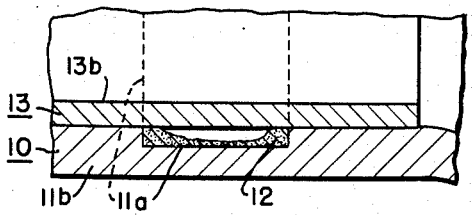
Figures 2 and 3 are enlarged longitudinal sectional detail views illustrating the connection joint construction of Figure 1 and how it is effected.
Figure 3:
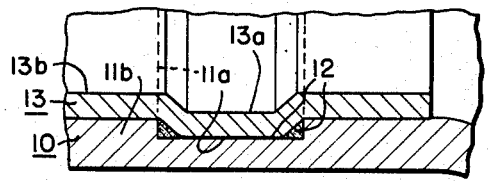

As the rolling-in operation progresses, and the wedge shaft 38 advances inwardly, the rollers 33 back away slightly from the shoulder 11c or edge 17d to permit an exact alignment between the rolled-in groove 13a or 13a' of the pipe member and the previously formed groove 11a of the sleeve 11b of the coupling body 11 or 17a of the tube end 17. See also Figures 2 and 3.

Figure 4:
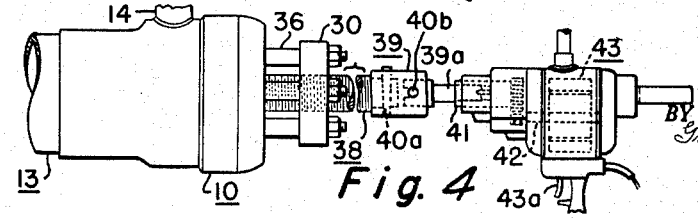
Figure 4 is a reduced fragmental longitudinal view illustrating actuating means for tools of my invention.

Although the wedge shaft 38 may be advanced and withdrawn manually, I prefer to employ a portable power driven device such as an electric drill motor 43, see Figure 4, equipped with a reversing switch 43a. The shaft 42 of the motor operates a geared-down rotating arbor socket 41 which carries a connecting arbor 39a. The arbor 39a is bifurcated at one end to removably engage pin 40b and is tapered at the other end to engage the tapered hole in a socket 41. The wedge shaft 38, see Figure 8, may have a cylindrical end portion 38c to receive the connector sleeve 39. Wedge pin 40a may be employed to secure the sleeve 39 on the portion 38c, so that the arbor 39a will actuate (rotate) the wedge shaft 38.

As shown in the drawings, the taper of the wedge portion 38b of the wedge shaft 38 is very slight, increases backwardly, and is preferably less than about 1/16 of an inch per inch of its length. The motor is preferably of slow speed type or has a slow speed reduction unit, so that it will operate at a no-load or idle speed of approximately 250 R. P. M.

In effecting the operation, the device or tool is inserted through the end of the pipe section to be secured and its back plate member 30 extends about one and one fourth inches or more therefrom. The operator may use one hand to grip the plate member 30 and cradle the motor in the crook of his other arm or position it on a suitable support. As the motor 43 rotates, the screw portion 38b advances within the threaded bore 30b of the back plate 30 from the initial position of Figures 5 and 6 to the final position of Figures 8 and 9, causing the tapered shaft portion 38a to engage the rollers 44 and 45 to move them radially outwardly against the inner circumference of the pipe end portion, to rotate both rollers of the pairs and the support cage within which they are rotatably and radially-movably mounted. That is, frictional contact between the rotating wedge shaft portion 38a and the rollers 44 and 45 causes the rollers to rotate, and in turn, the contact of the rotating rollers and the stationary pipe causes the support structure or cage to rotate at a slower rate or speed. As a result, the rollers move circularly about and within the end portion of the pipe member 13, while their support cage also rotates thereabout and the rolls 44 expand or distort a localized, circular area 13a or 13a' of the pipe into the machined-out groove 11a or 17a of the coupling part. The tool is centered by the rollers 45 and is aligned by the guide rollers 33. A shear edge on the rolled-in portion 13a or 13a' of the pipe is avoided, and as will be noted, the rolled-in groove is of curved section and has what may be termed a double, annular line contact with the internal groove 11a in the sleeve of the coupling body or the groove 17a of the tube end.

To secure an opposite end portion 13b' of the pipe member 13 on a tube end 17, the operation is substantially the same, see Figures 10 and 11 of the drawings.

In Figures 12 to 16, inclusive, I have shown a modified type of tool for a smaller size of diameter pipe section and its associated coupling parts. In this construction, I have indicated parts similar to those of the previously described device by prime affixes, and other parts by new numerals. In this construction, the black plate, cross support portion or disc member 30' is provided with a threaded central bore 30'b for rotatably receiving the threaded portion 38'b of the wedge shaft 38' and with holes 30'a for bolts 47 (three are shown). Each bolt has a threaded shank end portion 47a that is secured within a threaded bore 46a of a unitary, longitudinally-extending, main body part 46. As shown, the main body part 46 takes the place of the intermediate plate member 32 of the previously described construction and, itself, carries guide rollers 33' and the roller pairs 44' and 45'.

The guide rollers (three are shown) 33' are of slightly different construction than those of the previously described embodiment and are mounted within inset portions 46c of the main body portion 46 by shouldered mounting screws 34'. Each mounting screw 34' rotatably carries a roller 33' and has a threaded end 34'c that is secured in a threaded hole 46d in the body member 46 by a set screw 34'a. Each guide roller 33' is positioned within a roller socket 46c and has a cylindrical side face 33'd provided with a slightly beveled top edge. That is, the outer end of each roller 33' is very slightly beveled to contact the projecting shoulder 11c of the coupling body part.

The roller pairs 44' and 45' are mounted in open-side bearing groove portions 46e (see Figures 14 and 15) of the main body 46 of the tool and make possible the elimination of the stud shafts 37 of the other construction. Since the cut-out bearing surface grooves 46e are of enlarged diameter, they permit the rollers 44' and 45' to move radially within the member 46. The rollers are held in position by a front plate member 35' which is secured to the main body 46 by bolts 47. Each bolt 47 extends through a hole 35'b in the front plate member 35' and its inner threaded end 47a is secured within a bore 46f of the body member 46. It thus appears that the rollers 44' and 45' are mounted within a cage formed by the body 46 and a front plate member 35' and can thus operate in a similar manner to the rollers of the previously described construction. It will be noted that the front plate member 35' is provided with an enlarged central bore 35'a for by-passing the tapered portion 38'a of the shaft 38'. The body member 46 has an enlarged central, axial bore 46b longitudinally therethrough to by-pass the shaft 38'. This type of tool can be employed in a similar manner for rolling-in a joint in a tube end 17. The cylindrical portion 33'd of each roller 33' in such case rides against the edge 17d of the tube end part in a manner similar to the portion 33d of the type of tool shown in Figures 10 and 11.

I have determined that a single groove-joint connection between an end of the pipe member and a coupling part is sufficient to withstand all reasonable fluid pressure and other separating forces and that additional grooves are unnecessary. The mastic which is used is first placed in the machined groove 11a of the coupling sleeve 11b or the corresponding groove 17a of the coupling tube end 17, is squeezed out along the groove in the rolling-in operation, fills up any spaces between the machined groove of rectangular section and the rolled-in groove, and serves to bond closely abutting wall portions of the two grooves. On testing, I have determined that such a type of connection joint will withstand over 500 pounds per square inch pressure. This is in excess of published allowable working pressures for light wall aluminum alloy pipe. As pointed out, in forming a connection between a light wall pipe or tubing end portion and a reinforcing or tube end part 17, the same general type of rolling-in operation is accomplished. However, in this case, the cylindrical surface portion of the guide rollers make contact or engagement with the edge 17d thereof. The safety groove 17b may be formed during the same machining operation as the joint connection groove 17a.

What I claim is:

1. In a device for in one operation forming a secure connection joint between a relatively thin wall inner tubing member and a substantially cylindrical wall of a surrounding heavier wall housing body member that has a radial groove portion of substantially rectangular section open to the inside of its cylindrical wall, wherein an end portion of the tubing member is inserted in a telescopic relationship within the housing body member and an annular wall band of the end portion of the tubing member is in one operation radially-outwardly deformed into the groove portion of the housing body member and is radially-offset for the full thickness of the wall of the tubing member, wherein annular radially-outwardly-rolled wall portions are simultaneously formed in the tubing member immediately adjacent to and along opposite sides of the annular wall band, and wherein an annular radially-outwardly-rolled wall band is simultaneously formed on the tubing member in a longitudinally-forwardly spaced position with respect to the annular wall band, the combination which comprises, a longitudinally-extending tool cage having front, intermediate, and back cross support portions; connecting portions mounting said support portions along the device; front and back groups of longitudinally-extending and peripherally-positioned expansion rollers; said cage having longitudinally-endwise aligned and radially-outwardly-open mounting means between said front and intermediate support portions and operatively carrying the front group of rollers in an end-to-end relationship with the back group of rollers within said cage for rotation and radial motion with respect to each other and said cage; the rollers of said back group each being a band-flanging roller that has a pair of end face portions that taper radially-outwardly into longitudinally-inner annular portions and has an intermediate radially-projecting annular rim portion between the inner annular portions, the annular rim portion of each roller projecting radially-outwardly beyond the inner annular portions a distance at least corresponding to the full wall thickness of the tubing member; each roller engaging the inner surface of the tubing member to, with its annular rim portion, radially-outwardly deform an annular wall band in the tubing member for its full wall thickness into the groove portion of the housing body member and to, with its inner annular portions, roll adjacent wall portions of the tubing member into tight engagement with the housing body member along the annular wall band, so that the annular wall band will have a securely-joined offset relationship for the full thickness of the wall of the tubing member; the rollers of said front group each having a pair of end face portions that taper radially-outwardly into an intermediate guide banding portion that engages the inner surface of the tubing member longitudinally-forwardly of the rollers of said back group to roll the wall of the tubing member radially-outwardly into tight engagement with the wall of the housing body member; a group of radially-extending guide rollers mounted on said intermediate support portion in a peripherally-spaced relationship longitudinally-backwardly of said front and back roller groups to engage an end portion of one of the members and endwise-align the front and back groups of rollers within the tubing member; a wedge shaft, complementary thread means between said shaft and said back support portion rotatably-adjustably mounting said wedge shaft to operatively advance it through said intermediate support portion and within said cage, said wedge shaft having a tapered portion within said cage that decreases in taper forwardly from the back group of rollers towards the front group of rollers to frictionally engage the rollers of both groups and rotate them in a counter direction to the rotation of said shaft and move them radially-outwardly when said wedge shaft is rotated and relatively advanced within said cage by said thread means; said shaft being mounted to always, during the operation of the device, effect relative rotation between said cage and said front and back groups of rollers and between them and the tubing member after the front and back groups of rollers have been advanced radially-outwardly into tight engagement with the tubing member; said guide rollers being mounted to cooperate with said front group of rollers to align and guide said back group of rollers during the rotative advance of said wedge shaft; and said wedge shaft being free to rotatively advance within said cage by relative movement with respect thereto with increasing frictional resistance to rotation of said front and back groups of rollers and said cage with respect to the tubing member and to further radial-outward movement of said groups of rollers to effect a secure joining of the tubing member within the housing body member at longitudinally-spaced positions along the wall of the tubing member which positions correspond to operating positions on the tubing member of the guide banding portions of said front group and of the inner annular and annular rim portions of said back group of rollers.

2. In a device for in one operation forming a secure connection joint between a relatively thin wall inner tubing member and a substantially cylindrical wall of a surrounding heavier wall housing body member that has a radially-outwardly-offset groove portion of substantially rectangular section open to the inside of its cylindrical wall, wherein an end portion of the tubing member is inserted in a telescopic relationship within the housing body member and an annular wall band of the end portion of the tubing member is radially-outwardly-deformed into the groove portion of the housing body member and is radially-offset for the full thickness of the wall of the tubing member, wherein annular radially-outwardly-rolled wall portions are simultaneously formed in the tubing member immediately adjacent to and along opposite sides of the annular wall band, and wherein an annular radially-outwardly-rolled wall band is simultaneously formed on the tubing member in a longitudinally-forwardly spaced position with respect to the annular wall band, the combination which comprises, a longitudinally-extending tool cage having front, intermediate, and back cross support portions; connector portions mounting said support portions along the device; front and back groups of longitudinally-extending and peripherally-positioned expansion rollers; peripherally-spaced-apart pin shafts operatively mounted between said front and intermediate support portions to extend longitudinally of and within said cage; the rollers of each front and back group having an enlarged internal diameter, means mounting the rollers of said front group on said pin shafts in a longitudinal end-to-end adjacent relationship with respect to the rollers of said back group and in a radially-loosely and rotatable relation with respect to said pin shafts, each of said pin shafts having a portion operatively carrying a pair of end-to-end rolls of the groups for independent rotation and radial and pivotal motion with respect to the other rollers of the other pin shafts; the rollers of said back group each being a band-flanging roller that has a pair of end face portions that taper radially-outwardly into longitudinally-inner annular portions and has an intermediate radially-projecting annular rim portion between the inner annular portions, the annular rim portion of each roller projecting radially-outwardly beyond the inner annular portions a distance at least corresponding to the full wall thickness of the tubing member; each roller engaging the inner surface of the tubing member to, with its annular rim portion, radially-outwardly deform an anular wall band in the tubing member for its full wall thickness into the groove portion of the housing body member and to, with its inner annular portions, roll adjacent wall portions of the tubing member into tight engagement with the housing body member along the annular band, so that the annular wall band will have a securely-joined offset relationship for the full thickness of the wall of the tubing member; the rollers of said front group each having a pair of end face portions that taper radially-outwardly into an intermediate guide banding portion that engages the inner surface of the tubing member longitudinally-forwardly of the rollers of said back group to roll the wall of the tubing member radially-outwardly into tight engagement with the wall of the housing body member; a group of radially-extending guide rollers mounted on said intermediate support portion in a peripherally-spaced relationship longitudinally-backwardly of said front and back roller groups to engage an end portion of one of the members and endwise-align the front and back groups of rollers within the tubing member; a wedge shaft, complementary thread means between said shaft and said back support portion rotatably-adjustably mounting said wedge shaft to operatively advance it through said intermediate support portion and within said cage, said wedge shaft having a tapered portion within said cage that decreases in taper forwardly from the back group of rollers towards the front group of rollers to frictionally engage the rollers of both groups and rotate them in a counter direction to the rotation of said shaft and move them radially-outwardly when said wedge shaft is rotated and relatively advanced within said cage by said thread means; said shaft being mounted to always, during the operation of the device, effect relative rotation between said cage and said front and back groups of rollers and between them and the tubing member after the front and back groups of rollers have been advanced radially-outwardly into tight engagement with the tubing member; said guide rollers being mounted to cooperate with said front group of rollers to align and guide said back group of rollers during the rotative advance of said wedge shaft; and said wedge shaft being free to rotatably advance within said cage by relative movement with respect thereto with increasing frictional resistance to rotation of said front and back groups of rollers and said cage with respect to the tubing member and to further radial-outward movement of said groups of rollers to effect a secure joining of the tubing member within the housing body member at longitudinally-spaced positions along the wall of the tubing member which positions correspond to operating positions on the tubing member of the guide banding portions of said front group and of the inner annular and annular rim portions of said back group of rollers.

References Cited in the file of this patent

UNITED STATES PATENTS

| | | |
|---|---|---|
| 500,215 | Richards | June 27, 1893 |
| 1,063,258 | Haysom | June 3, 1913 |
| 1,433,028 | Nakagawa | Oct. 24, 1922 |
| 1,938,194 | Rader | Dec. 5, 1933 |
| 1,951,833 | Maupin | Mar. 20, 1934 |
| 1,970,061 | Stanfield | Aug. 14, 1934 |
| 2,383,214 | Prout | Aug. 21, 1945 |

FOREIGN PATENTS

| | | |
|---|---|---|
| 24,456 | Great Britain | Dec. 15, 1894 |
| 28,349 | Great Britain | Dec. 6, 1910 |

UNITED STATES PATENT OFFICE
CERTIFICATE OF CORRECTION

Patent No. 2,835,309                                               May 20, 1958

Robert A. Wallace

It is hereby certified that error appears in the printed specification of the above numbered patent requiring correction and that the said Letters Patent should read as corrected below.

Column 3, line 28, after "view" strike out "as"; column 8, line 55, for "black plate" read -- back plate --; column 11, line 46, for "anular" read -- annular --.

Signed and sealed this 26th day of August 1958.

(SEAL)
Attest:
KARL H. AXLINE                                                ROBERT C. WATSON
Attesting Officer                                        Commissioner of Patents